United States Patent Office 2,924,966
Patented Feb. 16, 1960

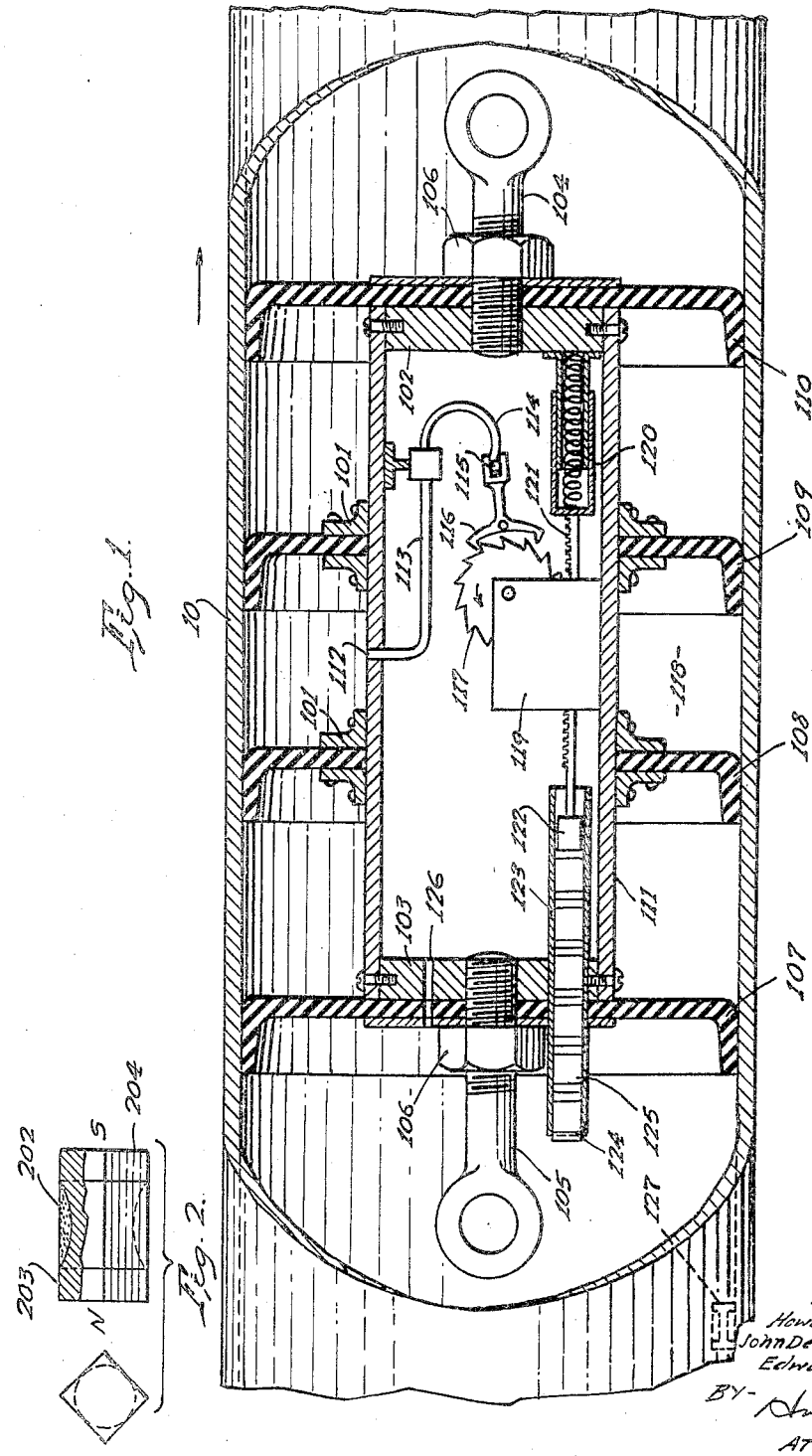

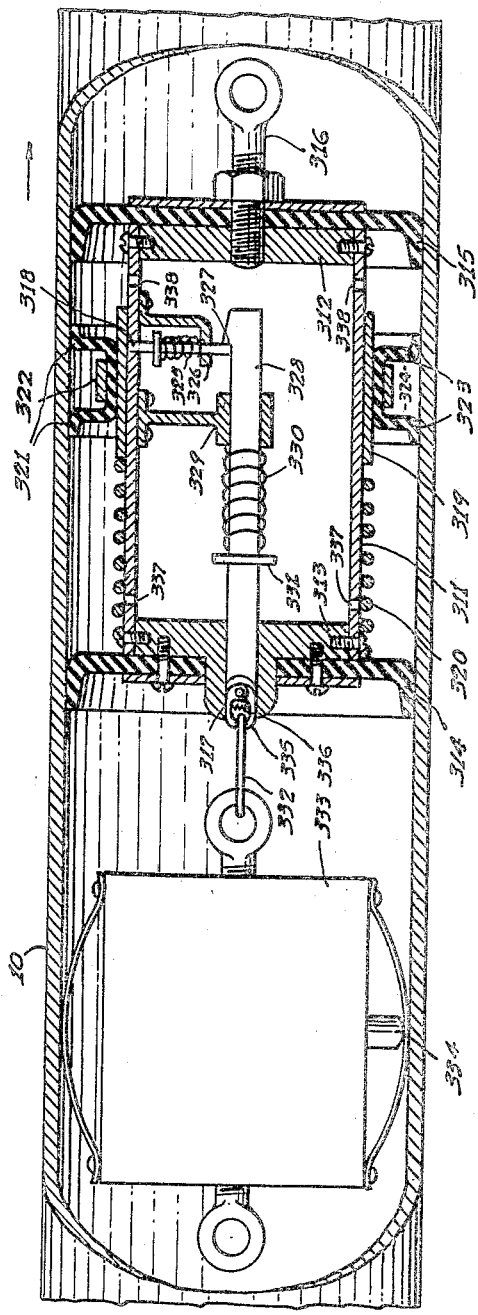

2,924,966

PIPELINE SURVEYING

Howard J. En Dean, Fox Chapel, Pa., John Delbert Jones, Tulsa, Okla., and Edward Topanelian, Jr., Pittsburgh, Pa., assignors to Gulf Research & Development Company, Pittsburgh, Pa., a corporation of Delaware Application June 28, 1956, Serial No. 594,577

7 Claims. (Cl. 73—40.5)

This invention concerns apparatus for automatically placing an easily observable telltale device whose location marks the location of a leak in a pipeline and in particular concerns apparatus for automatically placing an easily observable telltale device whose location marks location of a leak in a pipeline to which access may be had to the inside only.

It is well known that pipelines occasionally develop leaks which are sometimes difficult to locate. Under certain conditions a large leak may be found by inspection of the surface of the ground. However, small leaks in a buried pipeline are not always visible at the surface of the ground but such small leaks nevertheless may cause expensive damages to crops, water supplies, etc., in addition to the loss of accumulated amounts of the transport material. Where pipelines are laid in tile or otherwise protected by conduit, leaks may persist for a long time without detection and the location of surface evidence of the leak may not correspond with the actual location of the leak in the pipeline. In the case of pipelines which carry refined petroleum products such as gasoline, the fire and explosion hazards which result from a hidden leak are obvious and illustrate the necessity of promptly locating even small leaks in pipelines of this character.

This invention provides apparatus for locating a leak and automatically placing an easily observable telltale device whose location marks the leak in a pipeline to which access may be had to the inside only, said telltale device being identifiable on the surface of the ground so that the pipeline may be dug up and repaired at the location of the leak.

This invention provides an apparatus which is carried through the inside of the pipe by the pumped and transported fluid and which carries an instrumentality capable of detecting a leak in the pipe wall. The apparatus is placed in the pipe and caused to traverse the inside of the pipe by the transported fluid entirely free of any rigid physical connection to the ends of the pipeline. By means of this invention the entire pipeline may be tested as frequently as desired without introducing wires, lines or other extraneous means into the pipeline and without interfering with the normal operation of the pipeline. The apparatus places a telltale device at the location of the leak which may be repaired at a convenient time.

It is an object of this invention to provide an apparatus which may be freely pumped from one end of a pipeline to the other and which releases a telltale identifiable from the surface of the ground whenever a leak is encountered.

It is a further object of this invention to provide an apparatus which may be freely pumped from one end of a pipeline to the other and which releases a radioactive marker identifiable from the surface of the ground whenever the apparatus encounters a leak in the pipeline.

It is a further object of this invention to provide an apparatus which may be freely pumped from one end of a pipeline to the other and which releases a sound-generating telltale identifiable on the surface of the ground whenever the apparatus encounters a leak in the pipeline.

These and other useful objects are accomplished by this invention in the manner described in this specification of which the drawings form a part, and in which Figure 1 shows a diagrammatical view partly in section of an apparatus of this invention which releases a radioactive marker whenever it encounters a leak in the pipeline;

Figure 2 shows a preferred type of radioactive marker employed in this invention; and Figure 3 shows another embodiment of this invention partly in section which releases a sound-generating telltale device whenever the apparatus encounters a leak in the pipeline.

In the embodiment of this invention wherein it is desired to locate and mark with a telltale device leaks in a pipeline so that the locations of such leaks may be easily found from the surface of the ground, the apparatus isolates a progressively moving segment of the pipeline during its traverse and whenever such segment of the pipeline shows evidence of a leak by sudden drop in pressure the apparatus releases a telltale means which can be identified from the surface of the ground.

Referring to Figure 1 there is shown a diagrammatical view of an embodiment of this invention in which the apparatus releases a readily-detectable material whenever it encounters a leak in the pipeline 10. By way of example, in the embodiment shown in Figure 1 the apparatus releases a radioactive pellet whenever it encounters a leak in the pipeline. The penetrating radiation from the radioactive pellet may subsequently be detected on the surface of the ground above the pipeline by means of well-known devices, such as a geiger counter, scintillometer, etc. The apparatus of Figure 1 comprises a cylindrical carrier 111 having end plates 102 and 103 which are threaded to receive eyebolts 104 and 105 respectively. The nuts 106 serve to hold in place flexible cup-shaped packers 107 and 110 which are made of rubber or other elastic material. Each packer has a rearwardly extending lip which seals against the inner surface of the pipe. Additional packers 108 and 109 are mounted on the carrier intermediate the end packers by means of annular flanges 101. The packers serve as the means by which the pipeline fluid causes the apparatus to traverse the pipeline and also serve as the means for isolating a progressing section of the pipe.

The apparatus of Figure 1 is launched in the pipeline at the dispatching station through a customary scraper trap and upon entering the pipe is pumped therethrough by normal movement of the fluid transported by the pipeline. After traversing the pipeline the apparatus is recovered at the receiving end of the line by means of a scraper trap.

The annular space between the packers 108 and 109 has an opening 112 to which is connected a pipe 113 which communicate with the Bourdon tube 114. The outer extremity of the Bourdon tube engages at 115 an anchor 116 which together with pallet 117 forms an escapement mechanism which controls expansion of compressed spring 120. The escapement is connected through gear box 119 to rack 121 which is driven by compression spring 120 acting on one end of the rack 121. Whenever the device encounters a leak during its traverse of the pipeline, the drop in pressure in the isolated region 118 between the two middle packers causes the escapement to release one tooth. The rack 121 passes through the gear box and has at its other extremity a plunger 122 which slides in a cylinder 123. An opening 126 in the end of the carrier provides access of pipeline fluid to the interior of the carrier so as to effect pressure equalization on the plunger 122. Contained in the cylinder 123 between the end of the plunger 122 and the open rear end 124 of the tube are a series of capsules or pellets each containing a small charge of radioactive material. The pellets are preferably in the shape of a short triangular or square prism arranged to contain a permanent magnet as shown in Figure 2 which will by magnetic attraction cause the pellet to adhere to the pipeline wall and remain in place without being dislodged by the fluid flowing in the pipeline. The escapement, gear box, rack, and spring are so arranged that upon releasing the escapement one tooth the plunger 122 moves a distance sufficient to discharge one of the pellets 125 into the pipeline. The discharged pellet 127 will fall to the lower side of the pipeline behind the device. Each pellet contains a radioactive material, preferably of relatively short-lived artificial type, which gives off gamma rays of sufficient penetrating power to be detected through the pipe wall and the maximum cover over the pipeline. Radioactive emanations from the discharged capsule may then be detected at the surface of the ground and will indicate the presence of a leak nearby Figure 2 illustrates a preferred type of radioactive marker or pellet. The pellet comprises a prismatic body of magnetic material such as magnetized Alnico and having on its outer surface an annular recess 202 which is filled with radioactive material. The radioactive material filling the recess 202 may be either natural or artificially radioactive and may be applied to the pellet in the form of a paint or mixed with a plastic adhesive. The end sections 203 and 204 of the pellet form magnetic pole pieces, the pellet being magnetized in the longitudinal direction so that one end face is a north pole and the other end face is a south pole. When a pellet of this type is released from the device of Figure 1 it will attach itself by magnetic attraction to the inside surface of the pipeline and will not be displaced by motion of the pipeline fluid. The radioactive material 202 carried by the pellet is necessarily one whose radioactivity may readily be detected through the thickness of material representing the pipe wall, but the radioactive material should have an activity sufficiently penetrating so that it may be detected through an additional cover of several feet of earth. Inasmuch as the pellets are usually recovered upon repairing the leak in the pipeline they are generally not lost and may be reused repeatedly.

Figure 3 shows a diagrammatical view of an apparatus for releasing a sound-producing telltale when it encounters a leak in the pipeline. This device comprises a cylindrical carrier 311 having end closures 312 and 313 fastened to it by screws as shown. Each end of the carrier has a cup-shaped rubber packer as 314 and 315, the forward packer being held in place by means of bolt 316 with nut and washer as shown. The rear end closure 313 has a rearwardly-extending boss and the rear packer 314 has a large central hole to clear the boss, the packer being held in place by means of screws and an annular plate as shown. A sleeve 319 is carried on the outside of the cylindrical surface of carrier 311, the sleeve 319 having an easy sliding fit thereon. A compression spring 320 is placed between the sleeve 319 and the rear end of the carrier and serves to urge the sleeve into the forward position on the carrier 311. A channel-shaped annular rubber cup 321 is clamped to the outer surface of the sleeve 319 by means of a strap 322, whose ends are joined by a toggle clamp (not shown). The two lips 323 seal against the wall of the pipe and thereby isolate an annular space 324 inside the pipe. Whenever a leak is encountered in the wall of the pipe adjacent to the region 324, an immediate drop in pressure occurs in the region 324 and the annular packer 321 tends to stick or adhere to the leaking section of pipe. Inasmuch as the sleeve 319 can slide on the carrier 311, the latter moves forward until a sliding pin 318 is uncovered. Holes 337 and 338 in the carrier 311 permit free interchange of fluid between space behind and ahead of the sliding unit. A compression spring 325, which acts between a collar on the pin 318 and a guide bracket 326, urges the pin 318 outward as soon as its outer end is uncovered by the sleeve 319. Outward motion of the pin releases the catch 327 on an axial bar 328 which is guided by a bearing 329 and a central hole 317 in the rear end closure 313. A compressed spring 330 between the bearing 329 and a collar 331 urges the bar 328 to slide backward when the catch 327 is released. The rear end of the bar 328 has a pair of opposing hinged hooks 335, which in the retracted position shown may catch a loop of cable or chain link 332, but when the hooks are released from inside the bore 317 they are caused to expand by a spring 336 thus to release the loop. When the bar 328 is released from the latch 327, the hooks 335 are released from the bore 317 and open to release their tractive load. The cable or chain 332 attaches to a unit 333 which contains a mechanism including a percussion hammer 334 and associated storage battery or compressed air-driven actuator to periodically cause the hammer 334 to strike the pipe. The sound-generating unit 333 is a well-known type of device and does not per se form part of this invention.

In employing the apparatus of Figure 3 the carrier 311 is launched in the pipeline with the bar 328 in the retracted position and the sound-generating unit 333 attached thereto by cable 332. The entire apparatus is launched in the pipeline at the dispatching station through a customary scraper trap and upon entering the pipe is pumped therethrough by the normal movement of the fluid transported by the pipeline. The sound-generating unit 333 is started as soon as the device is launched in the pipeline. The progress of the assembly in the pipeline may thus be followed, the assembly being pumped through the pipeline by the normally-pumped fluid. When a leak in the pipeline is encountered in the region 324, as it slides along the inside of the pipe, motion of the sleeve 319 is arrested due to sticking of the packer 321 to the pipeline wall. Continued forward motion of the carrier 311 uncovers the end of the spring-pressed pin 318 and allows it to move outward thus releasing the latch 327. Spring 330 then forces the bar 328 backward and the hooks 335 release the cable 332. The sound-generating unit 333 has no packers so that if and when it is released in the pipeline, the sound-generating unit 333 remains in this location continually striking the pipe to make an audible sound as the hammer 334 strikes the pipe. The carrier 311 is eventually recovered in a scraper trap at the receiving end of the pipeline. Inasmuch as the sound-generating unit 333 is continuous in its operation it can readily be located by observation on the surface of the ground. The pipeline is subsequently dug up at this point and the leak repaired as well as the sound-generating unit recovered.

Certain aspects of this invention are disclosed and claimed in copending applications Ser. Nos. 594,405; 594,482; 594,483; 594,541, now Patent No. 2,834,113; 594,641, now Patent No. 2,884,624; 594,642, now abandoned; 594,643; all of which are by the same applicants and are assigned to the same assignee as the present application.

It is contemplated that prior to running the apparatus disclosed herein, one or more scrapers or other known cleaning devices may be pumped through the pipeline in order to prepare the pipeline for a survey. It is further contemplated that any of the devices shown herein may itself be equipped with one or more scraper sections if such is necessary to obtain a reliable survey. Furthermore, the number of packers used on the instrument carrier may be varied to suit conditions.

What we claim as our invention is:

1. Apparatus for automatically placing a telltale device at the location of a predetermined characteristic in a pipeline which comprises a vehicle insertable in the pipe, a packer on said vehicle adapted to form a sliding seal against the wall of the pipe, detecting means on said vehicle responsive to the desired characteristic, an element detectable on the surface of the ground, release means connecting said element with said vehicle, and means in said vehicle connected to said detecting means for actuating said release means when said desired characteristic is detected.

2. Apparatus for automatically placing a telltale device at the location of a predetermined characteristic in a pipeline which comprises a vehicle insertable in the pipe, a packer on said vehicle adapted to form a sliding seal against the wall of the pipe, detecting means on said vehicle responsive to the desired characteristic, a radioactive element releasably held on said vehicle, release means connecting said radioactive element with said vehicle, and means in said vehicle connected to said detecting means for actuating said release means whenever the desired characteristic is detected.

3. Apparatus for automatically placing a telltale device at the location of a predetermined characteristic in a pipeline which comprises a vehicle insertable in the pipe, a packer on said vehicle adapted to form a sliding seal against the wall of the pipe, detecting means on said vehicle responsive to the desired characteristic, a source of acoustic vibration releasably held on said vehicle, release means connecting said source with said vehicle, and means in said vehicle connected to said detecting means for actuating said release means whenever the desired characteristic is detected.

4. Apparatus for automatically placing a telltale device at the location of a leak in a pipeline which comprises a vehicle insertable in the pipe, a pair of spaced flexible packers on said vehicle, a pressure-responsive means on said vehicle connected to the space between said packers, an element releasably held on said vehicle detectable at the surface of the ground, release means connecting said element with said vehicle, means connected to said pressure-responsive means for actuating said release means whenever a reduction in pressure is detected by said pressure-responsive means.

5. Apparatus for automatically placing a telltale device at the location of a leak in a pipeline which comprises a vehicle insertable in the pipe, a pair of spaced flexible packers on said vehicle, pressure-responsive means on said vehicle connected to the space between said packers, a radioactive element releasably held on said vehicle, release means connecting said radioactive element with said vehicle, means in said vehicle connected to said pressure-responsive means for actuating said release means whenever a reduction in pressure is detected by said pressure-responsive means.

6. Apparatus for automatically placing a telltale device at the location of a leak in a pipeline which comprises a vehicle insertable in the pipe, a pair of spaced flexible packers on said vehicle, pressure-responsive means on said vehicle connected to the space between said packers, a source of acoustic vibration releasably held on said vehicle, release means connecting said source with said vehicle, and means in said vehicle connected to said pressure-responsive means for actuating said release means whenever a reduction in pressure is detected by said pressure-responsive means.

7. Apparatus for automatically placing a telltale device at the location of a leak in a pipeline which comprises a vehicle insertable in the pipe, a packer on said vehicle adapted to form a sliding seal against the wall of the pipe, a carriage longitudinally slidable on said vehicle, packer means on said carriage adapted to isolate a portion of the pipeline wall, a source of acoustic vibration associated with said vehicle, release means connecting said source with said vehicle, and means in said vehicle actuating said release means in response to movement of said carriage on said vehicle.

References Cited in the file of this patent

UNITED STATES PATENTS

| 1,662,429 | Lowy | Mar. 13, 1927 |
| 1,652,472 | Erwin et al. | Dec. 13, 1927 |
| 2,617,134 | Barton | Nov. 11, 1952 |
| 2,701,960 | Irwin | Feb. 15, 1955 |
| 2,782,370 | Ver Nooy | Feb. 19, 1957 |